UNITED STATES PATENT OFFICE.

STANLEY J. MORROW, OF CHICAGO, ILLINOIS.

PROCESS OF RENDERING WRITING INERADICABLE.

SPECIFICATION forming part of Reissued Letters Patent No. 11,958, dated December 24, 1901.

Original No. 630,255, dated August 1, 1899. Application for reissue filed March 13, 1900. Serial No. 8,564.

*To all whom it may concern:*

Be it known that I, STANLEY J. MORROW, of Chicago, in the county of Cook and State of Illinois, have invented a new and useful Improvement in Processes of Rendering Writing Ineradicable, of which the following is a specification.

My invention is in the nature of a process for rendering writing permanent and ineradicable for the purpose of greater security in the drawing of checks, notes, and other valuable papers whose figures or written words as written in ordinary ink are liable to be erased or changed after signature and also for the preservation of records where age is liable to cause the writing to fade.

The writing fluid which I prefer to employ consists of the following ingredients: Water, (substantially pure,) mineral acids, (muriatic or sulfuric,) and coloring-matter of any kind. The water, acid, and coloring-matter are combined in proportion so as to form a solution or fluid suitable for writing upon paper, and that when so written the lines will be distinctly visible, and that when artificial heat is properly applied to the written paper the coloring-matter and the fiber of the paper will carbonize to the depth to which the fluid has penetrated. I do not confine myself to any particular proportion for several reasons, among which are the following: When applied to thick paper carrying much starch or size, the acid and coloring-matter would be in larger proportions than for thin or pervious paper, and when used in books of record the percentage of acid must be still more reduced, so that all the acid will be driven off by the heat. The proportions will vary from one part acid with two parts water to one part acid with thirty-five parts water. The coloring-matter is added to enable the writer to see his lines of writing and may be in any desired proportions.

By the use of the above composition the writing is easily traceable, which is essential to the successful use of this fluid, and the strength of the acid largely determines the depth to which it penetrates. In this condition it is easily removed, and in order to render it ineradicable I apply artificial heat, which may be accomplished by an oil-lamp, gas-jet, special ovens, or in any other manner, either while the writing is fresh or when it becomes dry. Artificial heat is an important factor, as it causes the mineral acid to attack the cellulose of the paper and eliminates the hydrogen and oxygen, leaving only the carbon, which cannot be removed without destroying the paper. The carbon-tracings thus formed are not on the surface of the paper, like a pigment, but extend into the fiber to such a depth as may be desired by the user. By introducing into the paper a proportion of asbestos its fibers cross the lines of writing and prevent the carbonized cellulose from becoming brittle and falling out.

It will be remembered that the strength of the mineral acid is reduced, so that with ordinary temperatures the carbonization does not take place; but the chemical affinity of the mineral acid for hydrogen is stimulated by heat, and the carbonization of both coloring-matter and the fiber of the paper promptly takes place.

Having thus described my invention, what I claim as new, and desire to secure by Letters Patent, is—

1. The process of writing ineradicably, which consists in writing on paper with a colored acid-ink which renders the same immediately visible, and then carbonizing the writing by heat, substantially as described.

2. The process of writing ineradicably, which consists in writing on paper containing asbestos with an acid-ink, and then carbonizing the lines by heat, substantially in the manner set forth.

STANLEY J. MORROW.

Witnesses:
B. M. SIEGLE,
W. V. TEFFT.